United States Patent [19]

Court

[11] Patent Number: 5,026,031

[45] Date of Patent: Jun. 25, 1991

[54] FLUID-DAMPED RESILIENT BUSH

[75] Inventor: Peter T. Court, Corsham, England

[73] Assignee: BTR plc a British Company, United Kingdom

[21] Appl. No.: 198,743

[22] Filed: May 25, 1988

[30] Foreign Application Priority Data

Jun. 17, 1987 [GB] United Kingdom ................. 8714221
Feb. 13, 1988 [GB] United Kingdom ................. 8803354

[51] Int. Cl.[5] ................................................ F16F 5/00

[52] U.S. Cl. .................................... 267/140; 267/293; 267/219; 392/385

[58] Field of Search ...................... 267/140.1, 35, 121, 267/141, 219, 258, 292, 140.5, 137, 281, 293; 248/562, 636, 659, 638; 403/221, 222, 284, 274, 326, 319; 188/322.19; 277/135, 212 F, 212 R, 236

[56] References Cited

U.S. PATENT DOCUMENTS

| | | | |
|---|---|---|---|
| 4,588,174 | 5/1986 | Konishi | 267/35 |
| 4,702,346 | 10/1987 | Uno et al. | 267/140.1 |
| 4,705,410 | 11/1987 | Von Brock | 267/140.1 |
| 4,717,111 | 1/1988 | Saito | 248/659 |
| 4,739,979 | 4/1988 | Kanda | 267/140.1 |
| 4,741,521 | 5/1988 | Schiffner et al. | 267/140.1 |

FOREIGN PATENT DOCUMENTS

| | | |
|---|---|---|
| 0009120 | 4/1980 | European Pat. Off. . |
| 0044908 | 2/1982 | European Pat. Off. . |
| 0207194 | 1/1987 | European Pat. Off. . |
| EP213324 | 11/1987 | European Pat. Off. . |
| 8424307 | 10/1985 | Fed. Rep. of Germany . |
| 2587774 | 3/1987 | France . |
| 60-245849 | 12/1985 | Japan . |

*Primary Examiner*—Robert J. Oberleitner
*Assistant Examiner*—Mark T. Le
*Attorney, Agent, or Firm*—Stevens, Davis, Miller & Mosher

[57] ABSTRACT

A fluid-damped resilient bush, e.g. for use in a vehicle suspension comprises an outer sleeve and an intermediate sleeve between which a rubber bush is moulded as a one-piece moulding. Cavities are formed between the intermediate sleeve and an inner member, which is mounted within the one-piece moulding and sealed to the one-piece moulding by axially separate annular areas of the moulding which engage but are not bonded to the inner member. The cavities communicate with one another and are filled with damping fluid, the arrangement being such that displacement of the outer sleeve relative to the inner member causes displacement of fluid between the cavities.

15 Claims, 6 Drawing Sheets

22 12 32 15 A' 10 47 46 20 30 11 42 36 13 40 38 IV IV 23 21 48 34 49

III
15
II
II
10
A
11
11
III

15
A
10
12
13
11
17
45
50

22
12
32
15
A'
10
47
46
20
30
11
36
13
42
40
38
IV
IV
23
21
48
34
49

A
11
25
27
40
42
10
B
36
38
26
28
12
45

FLUID-DAMPED RESILIENT BUSH

This invention relates to a fluid-damped resilient bush, such as may be used as a component in a vehicle suspension.

It is known to manufacture a fluid-damped bush in which an inner rigid member and an outer rigid member have a resilient insert bonded to both members, the insert containing cavities which intercommunicate and are filled with liquid, the arrangement being such that relative displacement of the inner and outer members reduces the volume of one cavity and increases the volume of the other cavity with a resulting flow of liquid between the cavities, usually through a restricted passage, and thereby damping the relative movement of the two members.

One object of the present invention is to provide a fluid-damped resilient bush which can be economically manufactured.

According to the invention, a fluid-damped resilient bush comprises an outer sleeve, an intermediate sleeve and a resilient member moulded between the outer sleeve and the intermediate sleeve to provide a one-piece moulding, wherein an inner member is mounted within the one-piece moulding and sealed thereto by axially separate annular areas of the one-piece moulding engaging but not bonded to the inner member, at least two cavities being formed between the one-piece moulding and the inner member, the cavities being arranged to contain damping fluid and to communicate with one another.

Embodiments of the invention will now be described with reference to the accompanying drawings in which.

Figure 1:
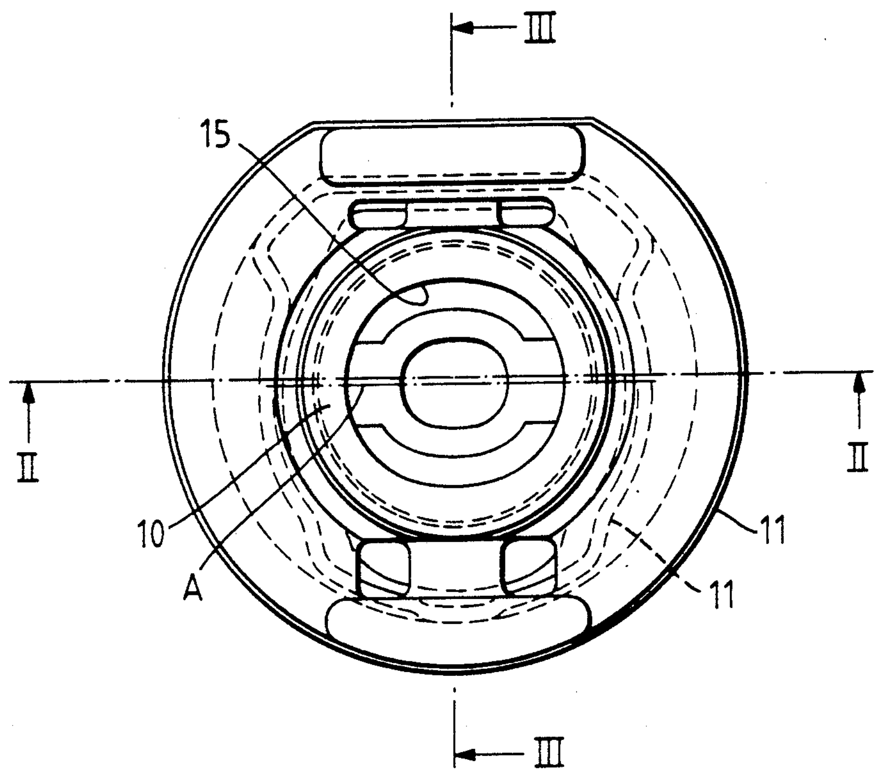
FIG. 1 is a plan view of a resilient bush in accordance with the invention.
Figure 2:
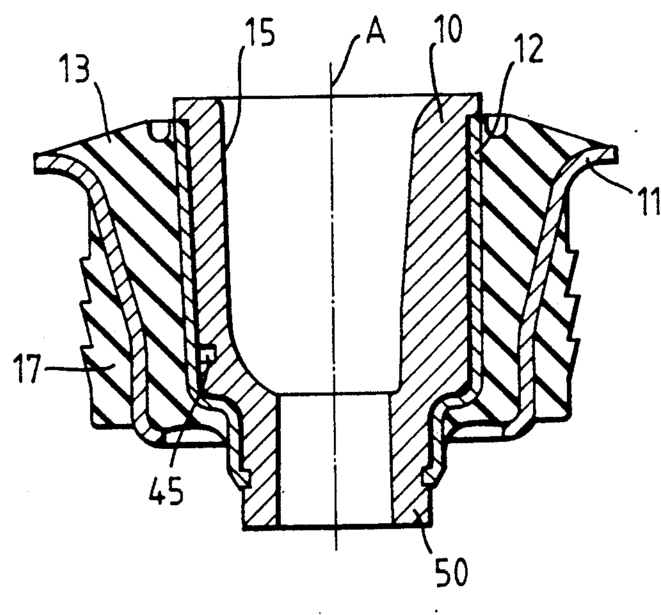
FIG. 2 is a section on the line II—II of FIG. 1.
Figure 3:
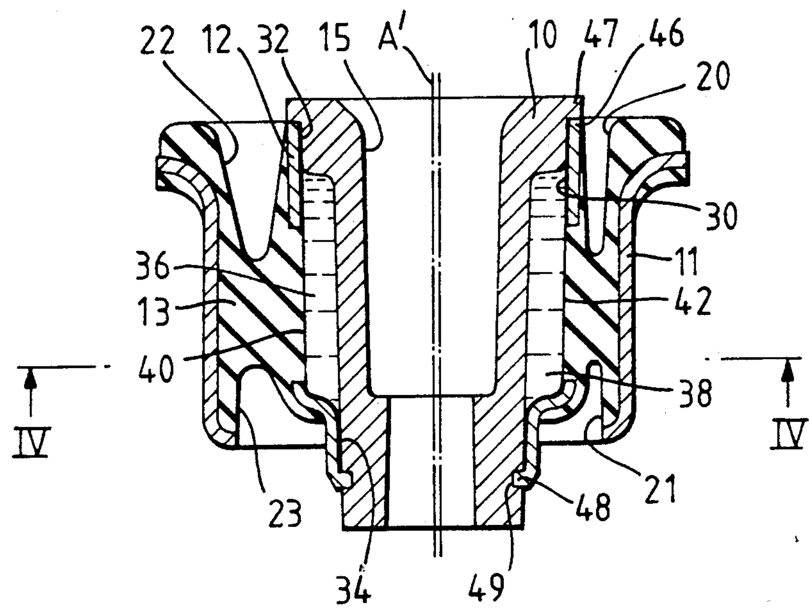
FIG. 3 is a section on the line III—III of FIG. 1.

The resilient bush shown in FIGS. 1 to 4 comprises an inner rigid member 10, an outer metal sleeve 11, and an intermediate sleeve 12. Between the outer sleeve and the intermediate sleeve a rubber resilient member 13 is bonded to the intermediate sleeve and outer sleeve so as to cushion relative movement between these components and thus between the outer sleeve and the inner member 10 to which the intermediate sleeve 12 is firmly secured. The axis of the bush is indicated by the line A of FIG. 2, and the inner member 10 contains a socket 15 of complex shape which is designed to receive a complementarily shaped shaft end to form part of the subframe mounting system of a motor car suspension, the bush being mounted on the vehicle body by a suitable clamp engaging the outer sleeve 11 via a moulded rubber outer covering portion 17 bonded to the outer sleeve.

In order to compensate for deflection of the inner member under static load when installed in the vehicle, the centre lines A, A' of the inner member in the appropriate planes (see FIGS. 1 and 3) are displaced slightly (in the unstressed state of the bush) from the central plane of the outer sleeve 11 (in which the section II—II is taken). Thus under normal static load the inner member is centralized within the outer sleeve and the resilient member 13 is pre-stressed. The resilient member is of rubber (which term is used herein to embrace any suitable elastomeric material) and is conveniently moulded in one operation to provide both the resilient member 13 and the outer covering 17, both suitably bonded to the outer and the intermediate metal sleeves and thus forming a unit for assembly with the inner member in a further operation.

Figure 4:
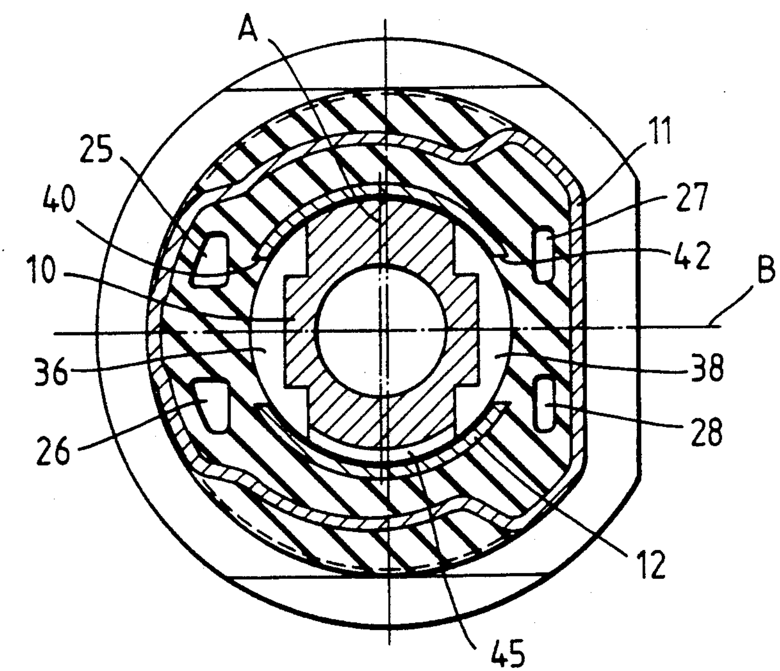
FIG. 4 is a section on the line IV—IV of FIG. 3.

In order to achieve required stiffnesses in different planes, the outer sleeve 11 is shaped as indicated by dotted lines in FIG. 1, and in FIG. 4, to provide selected thicknesses of rubber in different areas of the space thus formed between the intermediate and outer sleeves. Additionally, pockets 20, 21, 22, 23 and axial holes 25, 26, 27, 28 extending throughout the resilient member, (see FIG. 4) are provided for further modification of its stiffness in local areas.

The intermediate sleeve 12 is provided with a thin lining layer 30 of rubber on its inner surface for sealing engagement with unbroken annular surfaces 32, 34 of the inner member 10, and sealed cavities 36, 38 are thus formed between the intermediate sleeve and recessed parts of the inner member 10. Openings 40, 42 in the intermediate sleeve 12 communicate with the respective cavities 36, 38 and are sealed by the adjacent portions of the resilient member 13 which cover the areas of the openings and in the unstressed condition of the bush are substantially coplanar with the openings.

The two cavities 36, 38 are filled with a suitable liquid and intercommunication between the cavities is established by means of a groove 45 in the outer surface of the inner member 10. As previously described, the outer sleeve, resilient member and intermediate sleeve are manufactured as a single bonded unit, and assembly may be effected by immersing this unit in liquid and inserting the inner member 10. The sealing surfaces 32, 34 of the inner member are tapered to provide good sealing engagement with the thin rubber layer 30 (which may be internally ribbed to improve the seal) and assembly is completed by pressing the inner member 10 into the intermediate sleeve 12 until the adjacent end 46 of the sleeve engages a flange 47 on the inner member 10, following which the other end 48 of the sleeve is crimped into a groove 49 in the inner member 10 to provide a permanently secured and sealed assembly.

The end 50 of the member 10 may be made sufficiently long to provide an effective primary seal for a liquid-filling stage, following which the assembly may be removed from the liquid for the final pressing and crimping operation. By this means a pre-pressurization of the liquid may be achieved.

When relative movement of the inner member 10 and outer sleeve 11 takes place, particularly transverse deflection in a direction along the line B of FIG. 4, the rubber in the portion of the resilient member adjacent one of the openings is caused to bulge towards or into its respective cavity and thus to displace fluid from the cavity, through the passage formed by the groove 45, into the other cavity which will then be enlarged by outward bulging (relative to the cavity) of its adjacent portion of the resilient member.

The cross-sectional area of the groove 45 is selected to provide optimum damping at a required frequency of relative movement of the inner member and the outer sleeve.

Figure 5:
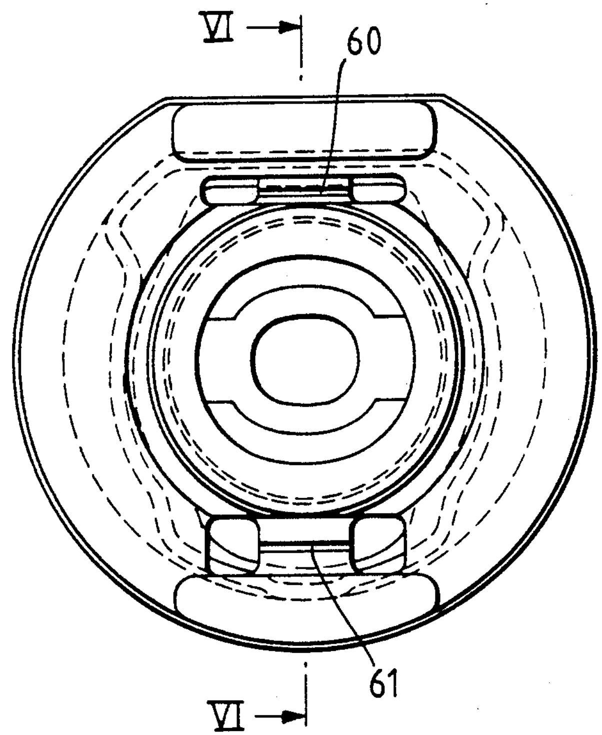
FIG. 5 is a plan view of an alternative resilient bush in accordance with the invention.
Figure 6:
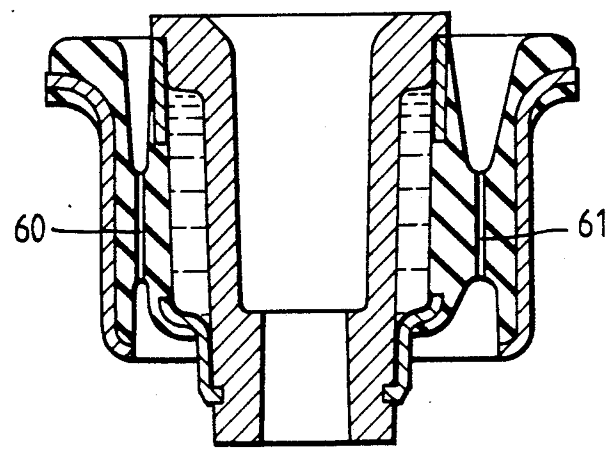
FIG. 6 is a section on the line VI—VI of FIG. 5.

The embodiment illustrated in FIGS. 5 and 6 is similar in most respects to that described with reference to FIGS. 1–4, and will not be described in detail. The modified feature consists of the provision of gaps 60, 61 between radially outer and inner portions of the resilient member in the regions adjacent the cavities, with the effect of providing lost-motion before the damping effect of the liquid-filled cavities and their connecting passage is brought into action. Thus for relative movement at low amplitudes (usually associated with higher frequencies) there is low damping and consequently reduced noise transmission, while at higher amplitudes (usually at lower frequencies) the lost-motion is taken up and the liquid-filled cavities and connecting groove operate to provide damping.

Figure 7:
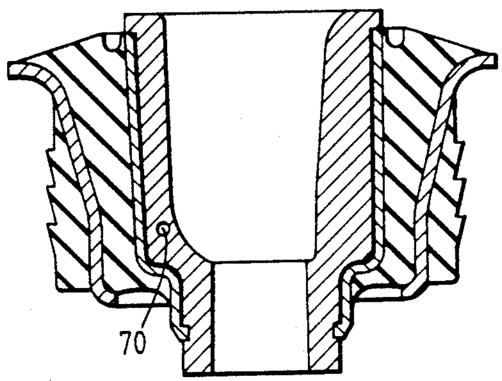
FIGS. 7, 8 and 9 are sections corresponding to FIG. 2 showing alternative embodiments of the invention.

FIG. 7 shows an alternative to the groove 45: instead, a drilling 70 in the inner member connects the two cavities.

Figure 8:
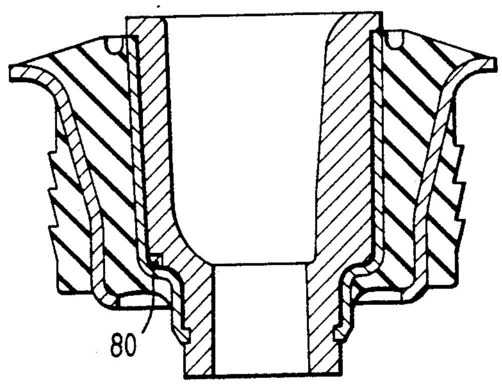

FIG. 8 shows an alternative position for a connecting groove 80 formed as a notch in a shoulder region of the inner member.

Figure 9:
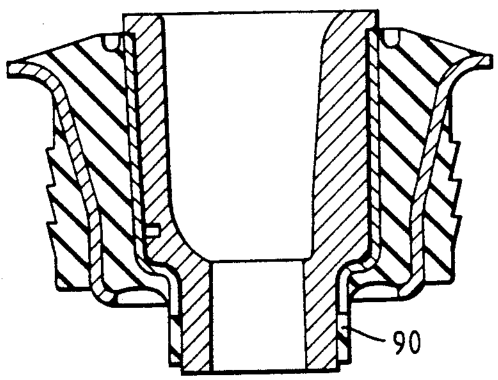

FIG. 9 shows an alternative means for securing together the inner member and the intermediate sleeve, using a stop ring 90 which is a press-fit on the inner member.

Figure 10:
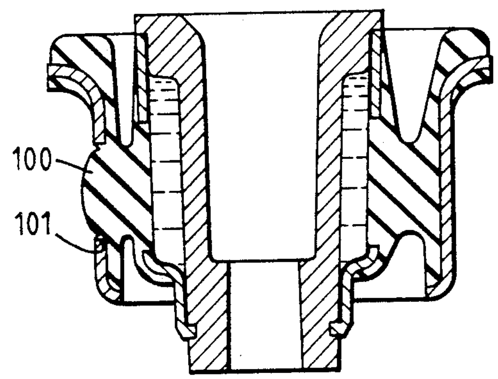
FIG. 10 is a section corresponding to FIG. 3 (but viewed in the opposite direction) showing a further alternative embodiment of the invention.

FIG. 10 shows an alternative arrangement in which the liquid in the cavities may be pre-pressurised on assembly into a suitable clamp on the vehicle. In this arrangement an opening 100 is formed in the outer sleeve, aligned with an opening in the intermediate sleeve, and a protrusion 101 of the resilient member stands proud of the opening 100 so that when a constricting clamp is fixed around the assembly the protrusion 101 is forced inwardly to pre-pressurise the liquid in the cavities.

Figure 11:
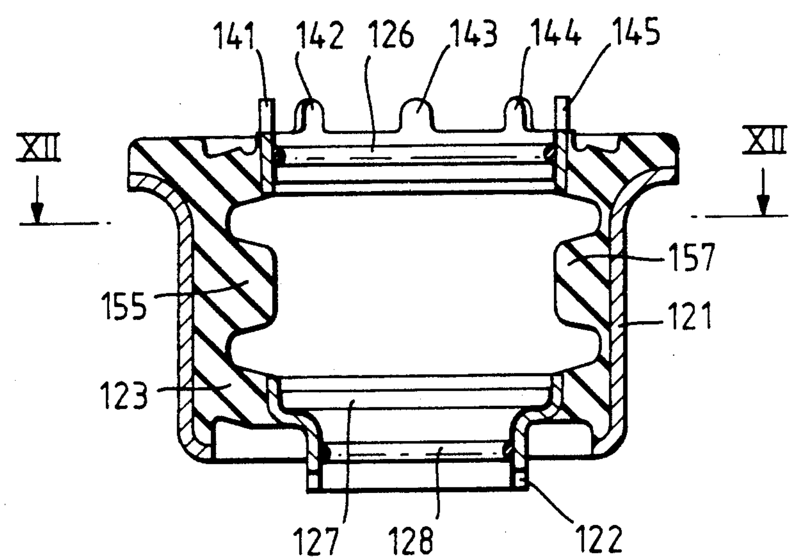
FIG. 11 is an axial section through a one-piece moulding comprising an outer sleeve, intermediate sleeve and resilient rubber member of a bush in accordance with another embodiment of the invention.
Figure 12:
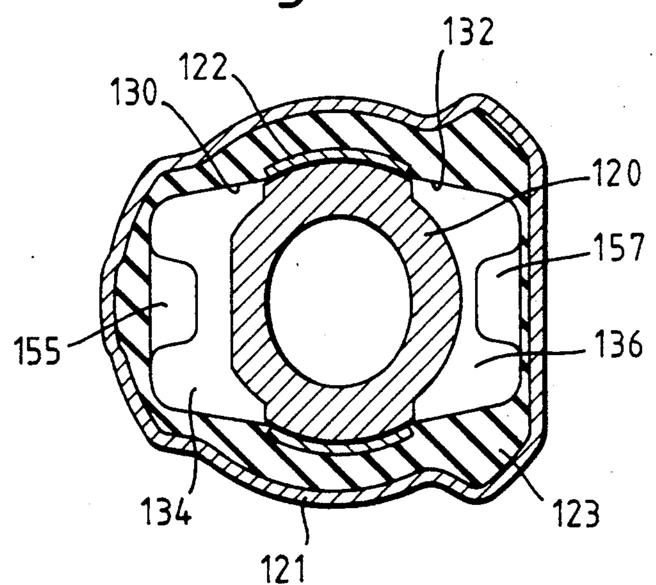
FIG. 12 is a section on the line XII—XII of FIG. 11, showing the bush assembly including an inner member.
Figure 13:
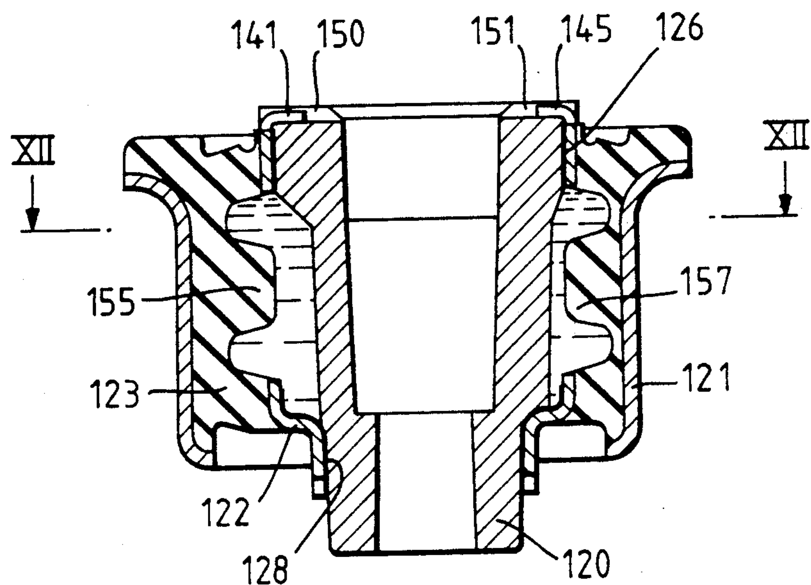
FIG. 13 is a section corresponding to FIG. 11, showing the bush assembly including an inner member.

The liquid-damped resilient bush shown in FIGS. 11–13 comprises an inner rigid member 120 (not shown in FIG. 11), an outer metal sleeve 121 and an intermediate sleeve 122. Between the outer sleeve and the intermediate sleeve a rubber resilient member 123 is bonded to the intermediate sleeve and outer sleeve so as to cushion relative movement between these components and thus between the outer sleeve and the inner member 120 to which the intermediate sleeve 122 is firmly secured.

The rubber member 123, the outer sleeve 121 and the intermediate sleeve 122 are made as a one-piece moulding. The rubber member 123 covers the whole of the inner surfaces of the outer sleeve 121 and the intermediate sleeve 122, so that when the tapered inner member 120 is inserted (see FIG. 13) annular ribbed rubber sealing areas 126, 127 and 128 are presented to the inner member. Recesses 130, 132 moulded into the rubber member 123 provide cavities 134, 136 which are filled with a suitable liquid on assembly and are permanently sealed, apart from a restricted connecting passageway which may be formed, for example, by a grooved or rebated portion of the inner member groove (not shown) extending between, and opening into, the two cavities.

The inner member is press-fitted into the intermediate sleeve 122, and is then retained in position by the bending-over of tabs 141–145 on the intermediate sleeve into engagement with corresponding notches 150, 151 at the adjacent end of the inner member.

In the arrangement of FIGS. 11–13, the cavities extend deeply into the rubber member 123, the intermediate sleeve having wide 'windows' to enable large cavities 134, 136 to be provided. 'Bump stops' 155, 157 projecting into the cavities are formed in the rubber moulding, and for some applications a rubber covering (not shown) may be provided around the outer surface of the outer sleeve 121 during the moulding operation.

Figure 14:
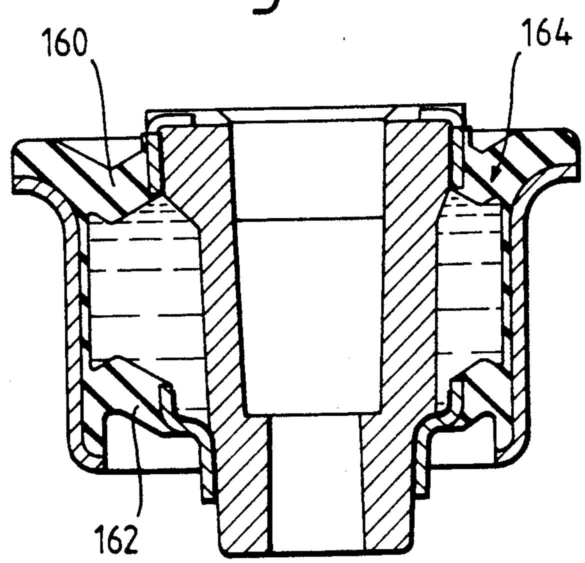
FIG. 14 is an axial section through a further alternative resilient bush in accordance with the invention.

FIG. 14 shows a variation in the design of the bush of FIGS. 11–13: lower axial and radial stiffness is achieved by shaping the end walls 160, 162 of the resilient rubber member 164 to an annular corrugated form so as to permit easier deflection. Also, the bump stops are omitted from the design of FIG. 14.

The various forms of liquid-damped bushes as described above have the advantage that they can be economically manufactured, the process entailing only a single rubber/metal moulding operation followed by a simple assembly operation, providing an efficient permanently liquid-filled bush, at low cost.

I claim:

1. A fluid-damped resilient bush comprising an outer sleeve, an intermediate sleeve and a resilient member moulded between the outer sleeve and the intermediate sleeve to provide a one-piece moulding, an inner member being mounted within the one-piece moulding and sealed thereto by axially separate annular areas of the one-piece moulding engaging but not bonded to the inner member, at least two cavities being formed between the one-piece moulding and the inner member, the cavities being arranged to contain damping fluid and to communicate with one another.

2. A bush according to claim 1 wherein the intermediate sleeve has a rubber lining.

3. A bush according to claim 2 wherein the rubber lining is internally ribbed.

4. A bush according to claim 1 wherein a drilling is provided in the inner member to connect the two cavities.

5. A bush according to claim 1 wherein the inner member and the intermediate sleeve are secured together by the crimping of an end of the intermediate sleeve into a groove formed in the inner member.

6. A bush according to claim 1 wherein the inner member and the intermediate sleeve are secured together by a stop ring press-fitted to the inner member.

7. A bush according to claim 1 wherein the intermediate sleeve comprises tabs at one end which are bent-over to engage the adjacent end of the inner member.

8. A bush according to claim 1 wherein the cavities extend into the resilient member.

9. A bush according to claim 8 wherein the resilient member comprises bump stops projecting into the cavities.

10. A bush according to claim 1 wherein an end wall of the resilient rubber member is of annular corrugated form so as to permit easier deflection.

11. A fluid-damped resilient bush comprising an outer sleeve, an intermediate sleeve and a resilient member moulded between the outer sleeve and the intermediate sleeve to provide a one-piece moulding, an inner member being mounted within the one-piece moulding and sealed thereto by axially separate annular areas of the one-piece moulding engaging but not bonded to the inner member, at least two cavities being formed between the one-piece moulding and the inner member, the cavities being arranged to contain damping fluid and to communicate with one another and having tapered sealing surfaces for engagement with the intermediate sleeve.

12. A fluid-damped resilient bush comprising an outer sleeve, an intermediate sleeve and a resilient member moulded between the outer sleeve and the intermediate sleeve to provide a one-piece moulding, an inner member being mounted within the one-piece moulding and sealed thereto by axially separate annular areas of the one-piece moulding engaging but not bonded to the inner member, at least two cavities being formed between the one-piece moulding and the inner member, the cavities being arranged to contain damping fluid and to communicate with one another with communication means between the cavities formed by a notch in a shoulder region of the inner member.

13. A fluid-damped resilient bush comprising an outer sleeve, an intermediate sleeve and a resilient member moulded between the outer sleeve and the intermediate sleeve to provide a one-piece moulding, an inner member being mounted within the one-piece moulding and sealed thereto by axially separate annular areas of the one-piece moulding engaging but not bonded to the inner member, at least two cavities being formed between the one-piece moulding and the inner member, the cavities being arranged to contain damping fluid and to communicate with one another, the intermediate sleeve having openings communicating with said cavities and said openings being sealed by the resilient member, whereby relative movement of the outer sleeve towards the opening of the intermediate sleeve adjacent one of the cavities causes bulging of a portion of the resilient member towards or into the said one cavity and thereby displaces fluid from the said one cavity into the other cavity.

14. A bush according to claim 13 wherein gaps are provided between radially outer and inner portions of the resilient member in the regions adjacent the cavities, to provide lost-motion before the damping effect of the connected liquid-filled cavities is brought into action.

15. A bush according to claim 13 wherein an opening is formed in the outer sleeve, aligned with an opening in the intermediate sleeve, and a protrusion of the resilient member stands proud of the opening in the outer sleeve so that the protrusion can be forced inwardly to pre-pressurise the liquid in the cavities.

* * * * *